United States Patent [19]

Ziaylek, Jr. et al.

[11] Patent Number: 4,913,398
[45] Date of Patent: Apr. 3, 1990

[54] HIGH SPEED DUMPING VALVE APPARATUS

[76] Inventors: Theodore Ziaylek, Jr., 140 Riverview Dr.; Michael P. Ziaylek, 3 Brook La., both of Yardley, Pa. 19067

[21] Appl. No.: 390,310

[22] Filed: Aug. 7, 1989

[51] Int. Cl.⁴ .................. F16K 25/00; F16K 1/18; F16K 31/53

[52] U.S. Cl. .......................... 251/87; 251/58; 251/144; 251/229; 251/249.5; 251/250.5; 251/279; 251/285; 251/298

[58] Field of Search ................ 251/58, 229, 144, 229, 251/285, 298, 84, 85, 86, 87, 299, 157, 177, 248, 249.5, 250.5

[56] References Cited

U.S. PATENT DOCUMENTS

| | | | |
|---|---|---|---|
| 446,059 | 2/1891 | Crawford | 251/279 |
| 1,856,138 | 5/1932 | Ruemelin | 251/298 |
| 2,443,036 | 6/1948 | Hopkins | 251/285 |
| 2,646,074 | 7/1953 | Hopkins | 251/279 |
| 2,847,181 | 8/1958 | Muller | 251/101 |
| 2,853,266 | 9/1958 | Raleigh | 251/298 |
| 3,658,293 | 4/1972 | Gaebel | 251/298 |
| 3,669,405 | 6/1972 | Baum | 251/279 |
| 3,727,880 | 4/1973 | Stock | 251/58 |
| 3,771,759 | 11/1973 | Pauquette | 251/58 |
| 3,817,490 | 6/1974 | Deeg | 251/298 |
| 4,480,812 | 11/1984 | Carpentier | 251/298 |
| 4,605,198 | 8/1986 | Greiner | 251/58 |

FOREIGN PATENT DOCUMENTS

| | | | |
|---|---|---|---|
| 72858 | 3/1946 | Norway | 251/298 |
| 652635 | 4/1951 | United Kingdom | 251/298 |

Primary Examiner—George L. Walton
Attorney, Agent, or Firm—Sperry, Zoda & Kane

[57] ABSTRACT

A high speed water dumping valve apparatus usable attached with respect to a water reservoir which includes a housing with a flow chamber and water inlet and outlet defined therein. A door with a gasket means is adapted to extend over the water inlet for selective sealing thereof. A door control member including a horizontally extending crankshaft and a crank yoke fixedly secured thereto is included. A drive bar is connected between the crank yoke and the door for controlling movement of the door between the opened and closed positions. The drive bar preferably is formed of two bar sections at an oblique angle with respect to one another such as to extend around the crankshaft to facilitate over-center locking of the door in place selectively. A handle is secured with respect to the crankshaft to be rotatable therewith to urge movement between opened and closed positions as desired.

19 Claims, 5 Drawing Sheets

HIGH SPEED DUMPING VALVE APPARATUS

BACKGROUND OF THE INVENTION

1. Field of the Invention

The present invention deals with the field of devices for high speed dumping of liquid such as water. The apparatus of the present invention is particularly adapted for usage with fire trucks wherein the force of gravity is used to remove water from a fire truck into more localized reservoirs at specific locations in a firefighting area. No pump means is utilized and as such a large cross section of water flow is required. The present invention provides a means for providing this large cross sectional water flow such as to facilitate high speed dumping of water while utilizing only gravity as the powering means. Such high speed water dumping apparatus is normally attached directly to a fire truck to remove water from the water tanks thereof.

2. Description of the Prior Art

Many prior art devices have been utilized to facilitate the high speed dumping of water from fire trucks in the past.

SUMMARY OF THE INVENTION

The present invention provides a high speed water dumping valve apparatus usable with a water reservoir which includes a housing defining a flow chamber therein adapted to receive water from a reservoir and expel water outwardly therefrom as desired.

The housing defines a water inlet therein adapted to receive water from the water reservoir for entry into the flow chamber. The housing further defines a water outlet adapted to facilitate expelling of water from the flow chamber into the external environment area as desired.

A door is movably positioned with respect to the water inlet such as to be movable between an opened position allowing water flow through the water inlet and a closed position extending across the water outlet to prevent water flow therethrough. A door control means is operatively secured with respect to the door and is movably mounted with respect to the housing within the flow chamber thereof. The door control means preferably includes a crankshaft rotatably movably mounted with respect to the housing within the flow chamber. A crank bracket member such as a crank yoke or the like is fixedly secured with respect to the crankshaft to be rotatably movable therewith. A drive bar is attached with respect to the door and is secured with respect to the crank yoke to be movable therewith.

A door actuation means is attached with respect to the crankshaft to control movement thereof and facilitate operative movement of the door means between the opened position allowing water flow through the water inlet and the closed position extending across the water outlet to prevent water flow therethrough.

A gasket sealing means may be positioned between the door and the housing about the water inlet means defined therein. Preferably the gasket sealing means is resiliently flexible to facilitate waterproof sealing of the door across the water inlet.

Preferably the door is pivotally mounted with respect to the housing to facilitate movement thereof between the closed position and the opened position. This pivotal securement means preferably includes a mounting shaft member and an elongated receiving slot through which the shaft member extends to facilitate seating of the resilient gasket sealing means between the door and the water inlet to minimize leakage therebetween.

The drive bar of the present invention preferably includes a first bar section and a second bar section which are integral with respect to one another. Preferably the first bar section is attached with respect to the door and the second bar section is attached with respect to the crank yoke. The second bar member and first bar member are preferably obliquely oriented with respect to one another in such a manner as to extend about the crankshaft means within the housing whenever the door is moved to the closed position. With this configuration an over-center locking device is achieved. Preferably the drive bar is pivotally secured with respect to the door means and the drive bar is pivotally secured with respect to the crank yoke.

A handle means is preferably secured with respect to the crankshaft means externally of the housing to facilitate operative control thereof. Alternatively or in addition a door actuation means can be included having gear linkage means secured with respect to the crankshaft externally of the housing and a drive means operatively secured with respect to the gear linkage to control movement of the crankshaft means and thus control movement of the door between the closed position and the opened position. This drive means could be electrical, hydraulic, pneumatic or otherwise.

The water outlet defined in the housing is positioned preferably horizontally below the water inlet to facilitate water flow through the chamber. Normally in this preferred configuration the water outlet is only very slightly below the water inlet. This incline can be utilized in order to make maximum use of gravity feed flow of the water through the flow chamber.

The crankshaft means is preferably rotatably mounted through the housing means in a generally horizontally extending direction. A stop means is also defined secured to the crank means externally of the housing and is adapted to selectively engage one of a plurality of locking apertures defined in the external housing to thereby maintain the door in a position of being completely closed, completely opened or at some point partially therebetween. The stop means preferably takes the form of a resiliently mounted ball handle means adapted to facilitate engagement of the stop means with respect to the retainment apertures selectively.

It is an object of the present invention to provide a high speed water dumping valve apparatus which is capable of rapidly dumping large volumes of water utilizing only the force of gravity feed flow.

It is an object of the present invention to provide a high speed water dumping valve apparatus which utilizes a minimum number of moving parts.

It is an object of the present invention to provide a high speed water dumping valve apparatus wherein maintenance requirements and down time is minimized.

It is an object of the present invention to provide a high speed water dumping valve apparatus wherein initial capital outlay for equipment is minimized.

It is an object of the present invention to provide a high speed water dumping valve apparatus wherein a large cross sectional area of liquid flow is made possible.

It is an object of the present invention to provide a high speed water dumping valve apparatus wherein high speed dumping of water directly from fire trucks into more localized containers at forefighting locations is rapidly achievable.

It is an object of the present invention to provide a high speed water dumping valve apparatus wherein a door means is included which is operatively movable between an opened position and a closed position such as not to impede flow during the opened position and such as to seal against leakage during the closed position.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
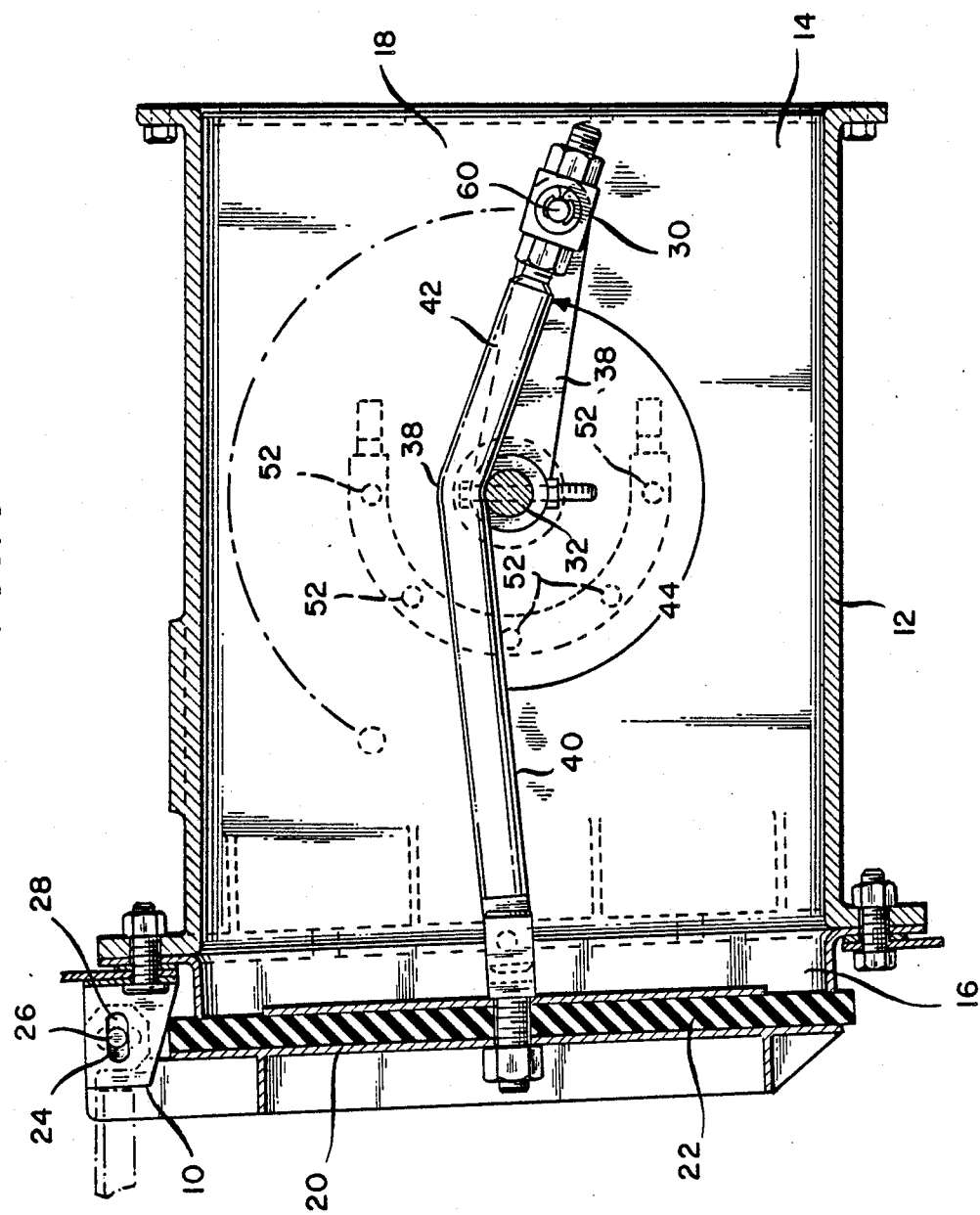
FIG. 1 is a side cross sectional view of an embodiment of the high speed water dumping valve apparatus of the present invention.
Figure 2:
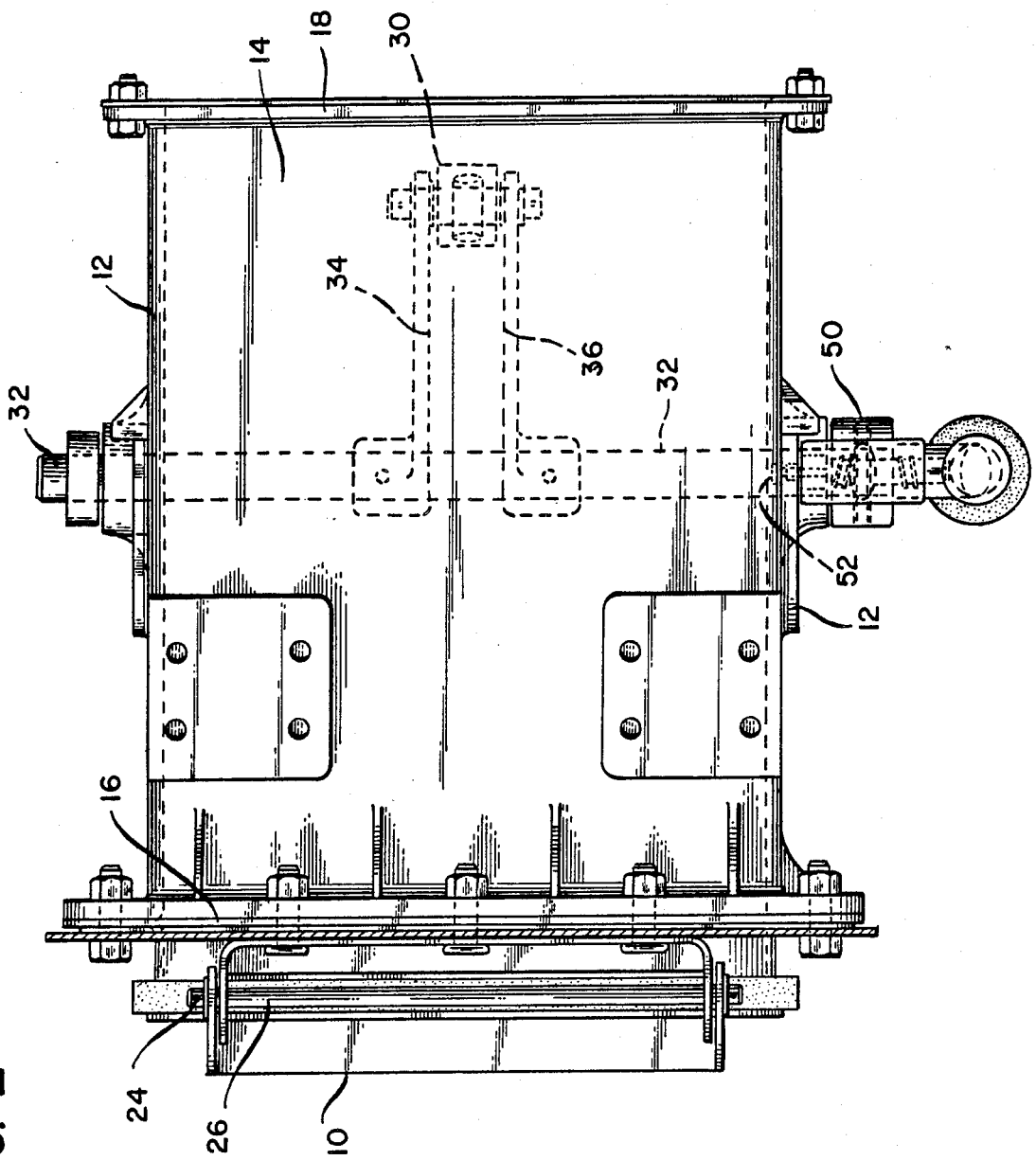
FIG. 2 is a top plan view of the embodiment shown in FIG. 1.
Figure 3:
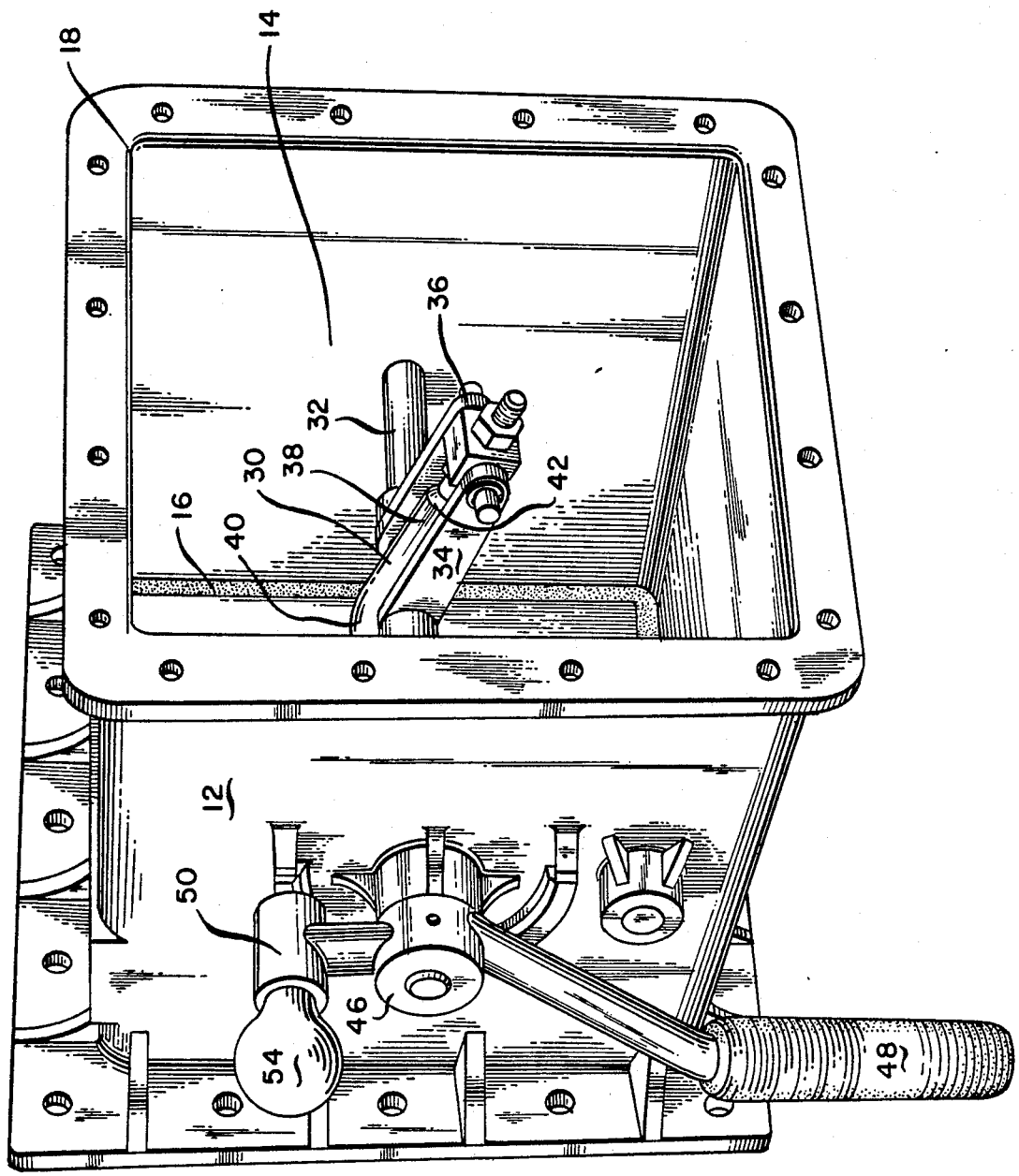
FIG. 3 is a perspective view of the embodiment shown in FIG. 1.
Figure 4:
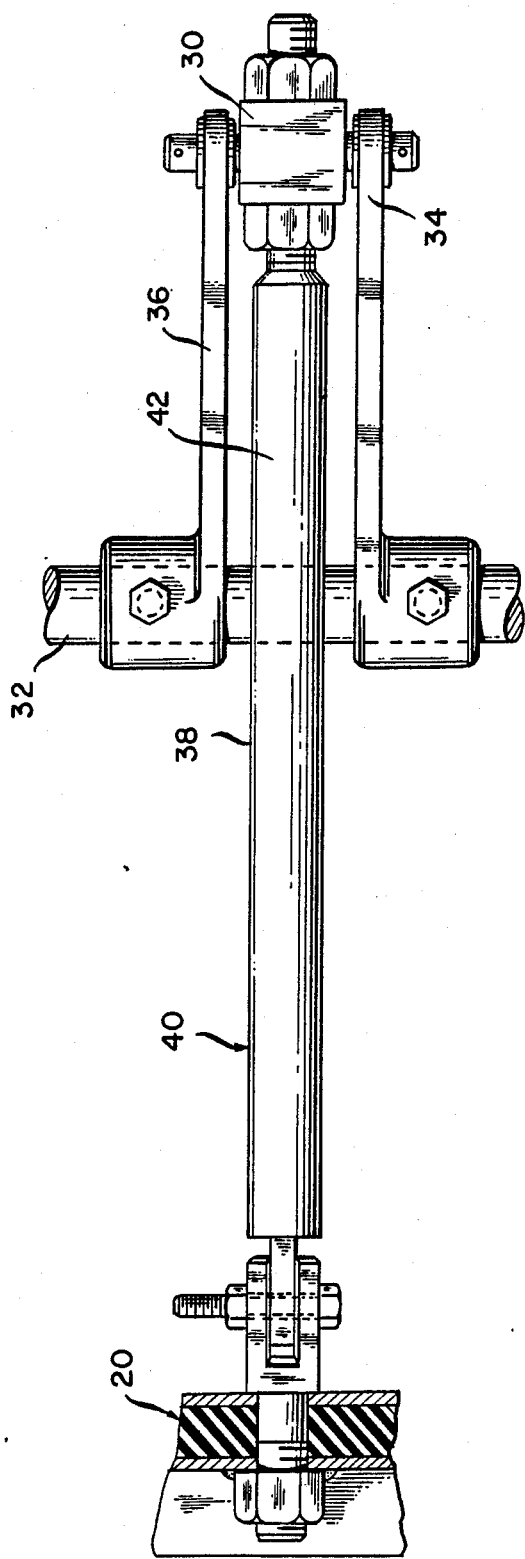
FIG. 4 is a top plan view of an embodiment of the door control means of the present invention.
Figure 5:
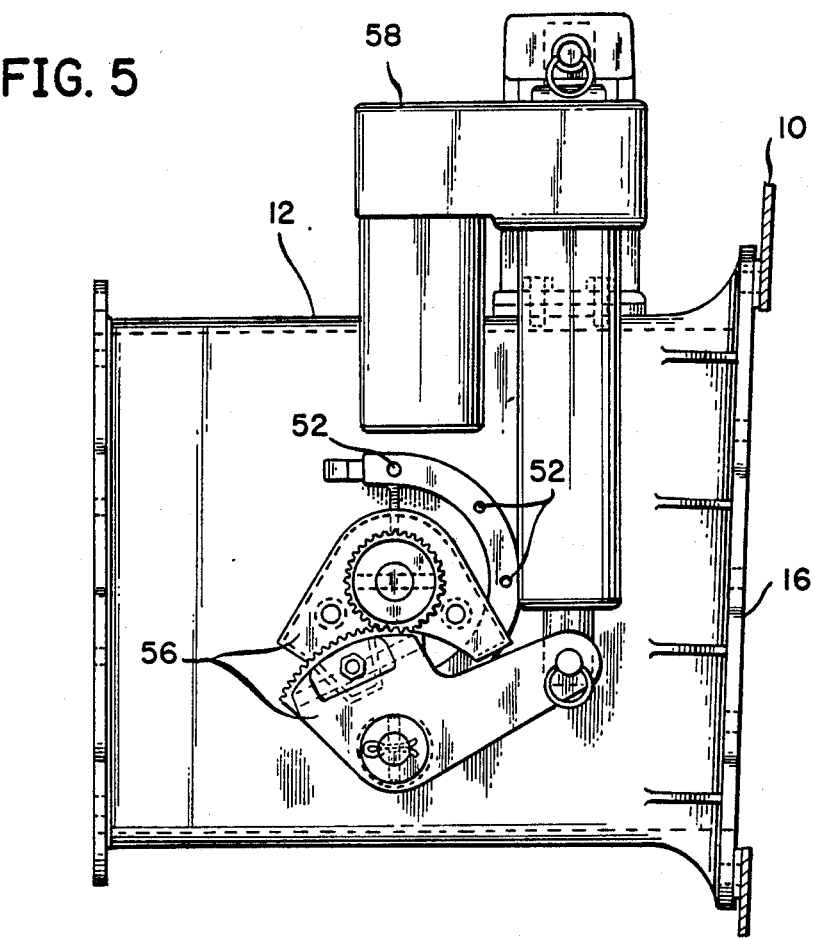
FIG. 5 is a side plan view of an alternative embodiment of the present invention showing a mechanically powered door actuation means.
Figure 6:
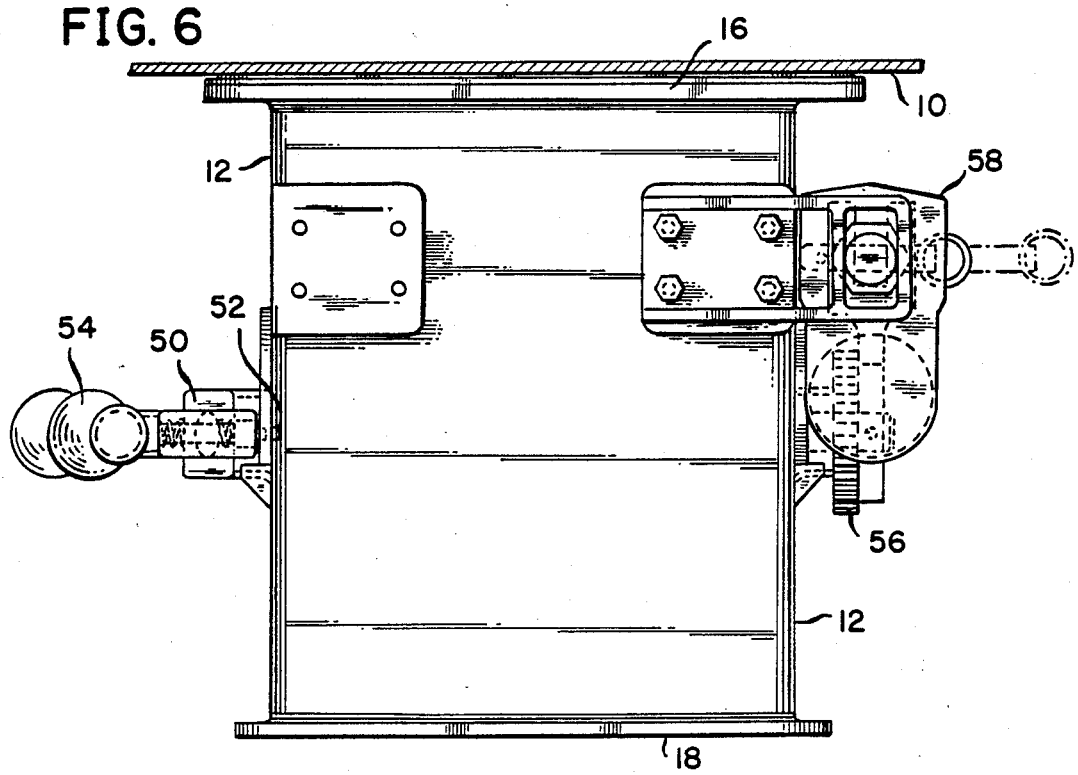
FIG. 6 is a top plan view of the embodiment shown in FIG. 5.

The present invention provides a high speed water dumping valve apparatus usable with a water reservoir 10. A housing means 12 defines a flow chamber 14 therein. Flow chamber 14 is adapted to receive water for urging thereof outwardly selectively as desired. Housing means 12 defines a water inlet means 16 positionable adjacent to the water reservoir 10 and a water outlet means 18 positioned extending horizontally and slightly downwardly therefrom. The water inlet means 16 is adapted to receive water from the water reservoir 10 to allow fluid flow communication with the flow chamber 14. In a similar manner water outlet means 18 is adapted to provide an exit for water being removed from the flow chamber 14 as desired.

A door means 20 is selectively positionable extending across the water inlet means 16 in such a manner as to control water flow therethrough. Door means 20 is preferably movable between an opened position and a closed position. In the closed position the door means 20 extends over the water inlet means 16. In the closed position the door means 20 is pivotally moved out of position extending over the water inlet 16 such as to allow full fluid flow therethrough.

A gasket sealing means 22 preferably of a flexible resilient material is positioned between the door means 20 and the housing means 12 peripherally extending about the water inlet means 16. Gasket sealing means 22 effectively seals the housing 12 with respect to the door 20 to prevent leakage therebetween.

A pivotal door securement means 24 may be included comprising a mounting shaft member 26 positioned extending through an elongated receiving slot 28. The mounting shaft member 26 is preferably fixedly secured with respect to the door means 20 and the elongated receiving slot 28 is defined in a bracket attached with respect to the housing 12 in such a manner that the mounting shaft 26 is movable within the elongated section of the slot 28 to facilitate equalized seating of the flexibly resilient gasket sealing means 22 in position between the door 20 and the housing 12 peripherally about the water inlet means 16. In this manner leakage along the gasket 22 will be effectively minimized.

A door control means 30 is preferably included having a crankshaft means 32 extending generally horizontally through the flow chamber 14. The crankshaft means 32 is preferably rotatably movable with respect to the housing 12 and extends out of the housing at one or more locations to facilitate control thereof. A crank bracket member 34 such as a crank yoke 36 is fixedly secured with respect to the crankshaft means 32 within the flow chamber 14. A drive bar means 38 is preferably secured at one end with respect to the door means 20 and at the other end with respect to the crank yoke 36 to be movable therewith. Preferably drive bar 38 is pivotally secured both with respect to the door 20 and with respect to the crank yoke 36.

In the preferred configuration the drive bar 38 includes a first bar section 40 pivotally secured with respect to the door means 20 and a second bar section 42 pivotally secured with respect to the crank bracket member 34. The first bar section 40 and the second bar section 42 are preferably integral with respect to one another but extend at an oblique angle 44 with respect to one another. With this orientation when the crankshaft means 32 is rotated to the closed position the oblique orientation of the first and second bar sections with respect to one another will allow the drive bar means 38 to extend around the crankshaft 32 to facilitate over-center locking of the door means 20 in the closed position.

A door actuation means 46 may be included secured with respect to a portion of the crankshaft means 32 which extends to the exterior of the flow chamber 14. Preferably door actuation means 46 will include a handle means 48 secured to the crankshaft outside of the housing. This handle means then facilitates rotational movement of the crankshaft 32 with respect to the housing 12 and through interconnection with the crank yoke 36 and the drive bar 38 facilitates movement of the door means 20 between the opened and closed positions.

Alternatively a gear linkage means 56 may be attached with respect to the crankshaft means 32 externally of the housing 12 and a drive means 58 may be operatively secured with respect to the gear linkage 56. In this manner rotation of the crankshaft can be controlled through gear linkage 56 by the selective operation of drive means 58.

A stop means 50 is preferably included positioned on the exterior of the housing 12 which may preferably take the form of a resiliently mounted ball handle means 54 and a plurality of retainment apertures 52 defined in the exterior of the housing 12. The resiliently mounted ball handle means 54 is preferably movable between various positions simultaneously with rotation of the crankshaft means 32 between the opened and closed position. Ball handle means 54 is adapted to extend into the retainment apertures 52 at the selective locations thereof to facilitate locking of the stop means 50 and thus locking of the door means 20 at selective locations such as completely opened, completely closed or one or more partial positions therebetween.

In operation of the present invention the door means 20 when in the opened position will allow free fluid flow through water inlet means 16 into flow chamber 14. If it is desired to move the door means 20 to the closed position the user will actuate the door actuation means 46 by manually rotating the handle means 48 or by initiating operation of the drive means 58. In either configuration the crankshaft means 32 will be caused to rotate in the clockwise direction as shown in FIG. 1. This rotation will cause the drive bar means 36 and in particular the second drive bar section 42 to move downwardly to a position over-center extending about the crankshaft 32. Once the rotational axis 60 is aligned with the horizontal center of the crankshaft 32 the rotational movement of the crankshaft 32 will become much easier since the rotational axis 60 is over-center. As the rotational axis 60 is moved downwardly by further rotation of crankshaft means 32 the second bar section 42 will be placed in the over-center position thereby facilitating locking of the door means 20 in the closed position. In this manner the flexibly resilient gasket sealing means 22 will be urged to slightly compress and cause a firm water-tight sealing means between the door 20 and the area of housing 12 peripherally located about water inlet means 16. Return movement to the opened position can be achieved by counterclockwise rotation of crankshaft 32 as shown in FIG. 1 by opposite rotational movement of the door actuation means 46.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A high speed water dumping valve apparatus usable with a water reservoir comprising:
   (a) a housing means defining a flow chamber therein adapted to receive water from a water reservoir and expel water outwardly therefrom, said housing means defining a water inlet means therein adapted to receive water from the water reservoir for entry into said flow chamber, said housing means further defining a water outlet means therein adapted to facilitate expelling of water from said flow chamber into the external environment area as desired;
   (b) a door means pivotally movable with respect to said water inlet means between an opened position allowing water flow through said water inlet means and a closed position extending across said water outlet means to prevent water flow therethrough;
   (c) a pivotal door securement means positioned at one end of said door means, said securement means including a mounting shaft member and a closed elongated receiving slot therefor to facilitate equalized seating along the length of said door means with respect to said housing means adjacent said water inlet means to minimize leakage responsive to said door means being in the closed position extending across said water inlet means, said elongated slot extending perpendicular to said door means to permit said securement means to move freely within said slot to facilitate an effective seal thereof against said housing adjacent said water inlet means when any irregularities exist between said door means and said housing adjacent said water inlet means;
   (d) a door control means operatively secured with respect to said door means and movably mounted with respect to said housing means within said flow chamber thereof, said door control means comprising:
      (1) a crankshaft means rotatably movably mounted with respect to said housing means within said flow chamber;
      (2) a crank bracket member fixedly secured with respect to said crankshaft means to be movable therewith;
      (3) a drive bar means pivotally attached with respect to said door means and adapted to selectively urge said door means into the closed position in abutting contact with respect to said housing adjacent said water inlet means and adapted to selectively urge said door means to the opened position with said door means spatially disposed with respect to said housing adjacent said water inlet means, said drive bar means further being secured with respect to said crank bracket member to be movable therewith; and
   (e) a door actuation means attached to said crankshaft means to control movement thereof and facilitate operative movement of said door means between the opened position allowing water flow through said water inlet means and the closed position extending across said water outlet means to prevent water flow therethrough.

2. A high speed water dumping valve apparatus usable with a water reservoir as defined in claim 1 further comprising a gasket sealing means positioned between said door means and said housing means about said water inlet means defined therein to facilitate sealing therebetween responsive to said door means being in the closed position.

3. A high speed water dumping valve apparatus usable with a water reservoir as defined in claim 2 wherein said gasket sealing means is resiliently flexible to facilitate waterproof sealing of said door means across said water inlet means.

4. A high speed water dumping valve apparatus usable with a water reservoir as defined in claim 1 wherein said drive bar means includes a first bar section and a second bar section being integral with respect to one another, said first bar section being attached with respect to said door means and said second bar section being secured with respect to said crank bracket member, said second bar member being obliquely oriented with respect to said first bar member to extend around said crankshaft means within said housing means responsive to said door means being in the closed position.

5. A high speed water dumping valve apparatus usable with a water reservoir as defined in claim 1 wherein said drive bar means is pivotally secured with respect to said crank bracket member.

6. A high speed water dumping valve apparatus usable with a water reservoir as defined in claim 1 wherein said crank bracket member comprises a crank yoke fixedly secured with respect to said crankshaft means to be rotatable therewith.

7. A high speed water dumping valve apparatus usable with a water reservoir as defined in claim 1 wherein said door actuation means includes a handle means secured with respect to said crankshaft means to facilitate operative control thereof.

8. A high speed water dumping valve apparatus usable with a water reservoir as defined in claim 7 wherein said handle means is secured to said crankshaft means externally with respect to said housing means.

9. A high speed water dumping valve apparatus usable with a water reservoir as defined in claim 1 wherein said door actuation means includes gear linkage means secured with respect to said crankshaft means externally with respect to said housing means and drive means operatively secured with respect to said gear linkage means to control movement of said crankshaft means and said door means between the closed position and the opened position.

10. A high speed water dumping valve apparatus usable with a water reservoir as defined in claim 9 wherein said drive means is electrical.

11. A high speed water dumping valve apparatus usable with a water reservoir as defined in claim 9 where said drive means is hydraulic.

12. A high speed water dumping valve apparatus usable with a water reservoir as defined in claim 9 wherein said drive means is pneumatic.

13. A high speed water dumping valve apparatus usable with a water reservoir as defined in claim 1 wherein said water outlet means is positioned horizontally below said water inlet means to facilitate water flow through said flow chamber.

14. A high speed water dumping valve apparatus usable with a water reservoir as defined in claim 1 wherein said crankshaft means is rotatably mounted through said housing means in a generally horizontally extending direction.

15. A high speed water dumping valve apparatus usable with a water reservoir as defined in claim 1 further comprising a stop means secured with respect to said crankshaft means externally of said housing and being adapted to selectively engage said housing to maintain said door means in position as desired.

16. A high speed water dumping valve apparatus usable with a water reservoir as defined in claim 15 wherein said housing means defines a retainment aperture means externally thereon adapted to receive said stop means in engagement therein for maintaining said door means in position as desired.

17. A high speed water dumping valve apparatus usable with a water reservoir as defined in claim 16 wherein said housing means includes a plurality of individual retainment holes for maintaining said door means in a position being opened, mostly, opened, mostly closed and closed.

18. A high speed water dumping valve apparatus usable with a water reservoir as defined in claim 16 wherein said stop means includes a resiliently mounted ball handle means adapted to facilitate engagement of said stop means with respect to said retainment aperture means.

19. A high speed water dumping valve apparatus usable with a water reservoir comprising:
 (a) a housing means defining a flow chamber therein adapted to receive water from a water reservoir and expel water outwardly therefrom, said housing means defining a water inlet means therein adapted to receive water from the water reservoir for entry into said flow chamber, said housing means further defining a water outlet means therein adapted to facilitate expelling of water from said flow chamber into the external environment area as desired, said water outlet means being positioned horizontally below said water inlet means to facilitate water flow through said flow chamber, said housing means defining a plurality of retainment apertures externally therein;
 (b) a door means movable with respect to said water inlet means between an opened position allowing water flow through said water inlet means and a closed position extending across said water outlet means to prevent water flow therethrough;
 (c) a resiliently flexible gasket sealing means positioned between said door means and said housing means about said water inlet means defined therein;
 (d) a pivotal door securement means positioned at one end of said door means for pivotally mounting said door means with respect to said housing means, said pivotal door securement means including a mounting shaft member and a closed elongated receiving slot therefore to facilitate equalized seating along the length of said resilient gasket sealing means between said door means and said water inlet means to minimize leakage responsive to said door means being in the closed position extending across said water outlet means said elongated slot extending perpendicular to said door means to permit said securement means to move freely within said slot to facilitate an effective seal thereof against said housing adjacent said water inlet means when any irregularities exist between said door means and said housing adjacent said water inlet means;
 (e) a door control means operatively secured with respect to said door means and movably mounted with respect to said housing means within said flow chamber thereof, said door control means comprising:
  (1) a crankshaft means rotatably movably mounted in a generally horizontally extending direction with respect to said housing means within said flow chamber;
  (2) a crank bracket means fixedly secured with respect to said crankshaft means to be movable therewith, said crank bracket means comprising a crank yoke;
  (3) a drive bar means attached with respect to said door means and secured with respect to said crank bracket member to be movable therewith, said drive bar means including a first bar section and a second bar section being integral with respect to one another, said first bar section being attached with respect to said door means and said second bar section being secured with respect to said crank bracket member, said second bar member being obliquely oriented with respect to said first bar member to extend around said crankshaft means within said housing means responsive to said door means being in the closed position, said first bar section being pivotally secured with respect to said door means and said second bar section being pivotally secured with respect to said crank yoke, said crankshaft means and said crank bracket member being rotatable to urge said second shaft section of said drive bar means to a position over center with respect to said crankshaft means to facilitate retainment of said door means in the closed position as desired;

(f) a door actuation means attached to said crankshaft means to control movement thereof and facilitate operative movement of said door means between the opened position allowing water flow through said water inlet means and the closed position extending across said water outlet means to prevent water flow therethrough, said door actuation means including a handle means secured with respect to said crankshaft means externally of said housing means to facilitate operative control thereof; and (g) a stop means secured with respect to said crankshaft means externally of said housing and being adapted to selectively engage said retainment apertures defined in said housing to maintain said door means in position as desired, said stop means including a resiliently mounted ball handle means adapted to facilitate engagement of said stop means with respect to said retainment aperture means.

* * * * *